United States Patent
Diaz et al.

(10) Patent No.: US 10,030,722 B2
(45) Date of Patent: Jul. 24, 2018

(54) SYSTEM AND METHOD FOR DETERMINING WHEN A SELECTABLE ONE-WAY CLUTCH HAS MECHANICALLY RELEASED

(71) Applicant: GM Global Technology Operations LLC, Detroit, MI (US)

(72) Inventors: Roberto Diaz, Novi, MI (US); David C. Webert, Livonia, MI (US); Patrick M. Gibson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 15/345,566

(22) Filed: Nov. 8, 2016

(65) Prior Publication Data

US 2018/0128328 A1    May 10, 2018

(51) Int. Cl.
*F16D 48/06* (2006.01)
*F16D 41/12* (2006.01)

(52) U.S. Cl.
CPC .......... *F16D 48/06* (2013.01); *F16D 41/125* (2013.01); *F16D 2500/10412* (2013.01); *F16D 2500/10493* (2013.01); *F16D 2500/3065* (2013.01); *F16D 2500/30406* (2013.01); *F16D 2500/30814* (2013.01); *F16D 2500/502* (2013.01); *F16D 2500/7082* (2013.01); *F16D 2500/7108* (2013.01)

(58) Field of Classification Search
CPC ................... F16D 48/06; F16D 41/125; F16D 2500/7108; F16D 2500/7082; F16D 2500/502; F16D 2500/30406; F16D 2500/3065; F16D 2500/10793; F16D 2500/10412; F16D 2500/30814
See application file for complete search history.

(56) References Cited

U.S. PATENT DOCUMENTS

| | | |
|---|---|---|
| 2,540,154 A | 2/1951 | Winder |
| 2,679,869 A | 3/1959 | Dodge |
| 3,166,171 A | 1/1965 | Schwerdhofer et al. |
| 5,156,575 A | 10/1992 | Garrett |
| 6,244,965 B1 | 6/2001 | Klecker et al. |
| 7,699,746 B2 | 4/2010 | Maguire et al. |
| 7,878,316 B2 | 2/2011 | Joppeck |
| 2006/0021839 A1 | 2/2006 | Kimes et al. |
| 2006/0278486 A1 | 12/2006 | Pawley et al. |

(Continued)

*Primary Examiner* — David J Hlavka

(57) ABSTRACT

A system for determining when a selectable one-way clutch has mechanically released includes an update timer identifying if each of a converter model engine torque, a transmission input torque, and a torque converter slip are positive for a predetermined period of time. An SOWC slip value is calculated using an output signal from each of: at least one transmission internal speed sensor producing an output signal representative of a speed of an internal component of a transmission; and at least one transmission output speed sensor producing an output signal representative of a speed of an output of the transmission. An SOWC released signal is issued if either all of the measured converter model engine torque, the measured transmission input torque, and the measured torque converter slip are positive for at least the predetermined period of time, or the calculated SOWC slip value is greater than a predetermined threshold.

20 Claims, 6 Drawing Sheets

(56) References Cited

U.S. PATENT DOCUMENTS

| | | | |
|---|---|---|---|
| 2008/0223681 A1 | 9/2008 | Stevenson et al. | |
| 2012/0115663 A1* | 5/2012 | Wilton | F16D 25/0632 |
| | | | 475/144 |
| 2016/0377126 A1* | 12/2016 | Essenmacher | F16D 27/02 |
| | | | 192/84.6 |
| 2017/0240038 A1* | 8/2017 | Spangler | B60K 6/38 |

* cited by examiner

SYSTEM AND METHOD FOR DETERMINING WHEN A SELECTABLE ONE-WAY CLUTCH HAS MECHANICALLY RELEASED

FIELD

The present disclosure relates to torque transmitting devices that are selectively engaged to achieve multiple gear ratios as well as forward and reverse operations in automobile transmissions.

BACKGROUND

The statements in this section merely provide background information related to the present disclosure and may or may not constitute prior art.

A multi-speed transmission can use a combination of clutches, planetary gear arrangements, and fixed interconnections to achieve a plurality of gear ratios. In one example, friction type clutches are used in the transmission, and are selectively engaged to achieve a particular gear ratio. However, when disengaged, friction clutches tend to produce drag when there is relative motion between the clutch input member and the output member, which can lead to decreased fuel economy.

In an effort to improve fuel economy, a selectable one-way clutch (SOWC) may be employed instead of a friction clutch to transmit power from a first input member to a second driven member. Known SOWCs transmit torque in a first rotational direction and release or decouple in a second, opposite rotational direction. Once released, the driving member is free to rotate in the second opposite direction relative to the first direction, and the one-way clutch can overrun or freewheel. This allows the vehicle to travel in a coasting or gliding mode where the drivetrain is decoupled from the engine, thus minimizing losses associated with the drivetrain turning the engine.

Known SOWCs are commonly released at a near zero vehicle speed or when there is a positive input torque through the driveline. For example, the transmission may be precluded from proceeding with an upshift from a first gear to a second gear until the SOWC has released. To assist in controlling the transmission, known SOWC installations may include a release or position sensor to detect when the SOWC has been mechanically released. Drawbacks of the use of position sensors however, are that such sensors require their own installation space, power supply, and control system interface. In addition, certain transmission designs do not include position sensors that can be used for this purpose.

Thus, while current transmission SOWCs achieve their intended purpose, there is a need for a new and improved method for determining when a selectable one way clutch has mechanically released.

SUMMARY

According to several aspects, a system for signaling when a selectable one-way clutch of an automatic transmission has mechanically released includes a positive torque algorithm continuously collecting a torque value for at least one of a converter model engine torque, a transmission input torque, and a torque converter slip. A negative torque algorithm continuously running in parallel with the positive torque algorithm calculates an SOWC slip value. An SOWC released signal is issued if either the value collected by the positive torque algorithm is maintained for a first predetermined period of time or if the SOWC slip value calculated by the negative torque algorithm is maintained for a second predetermined period of time.

In an additional aspect of the present disclosure, the value collected by the positive torque algorithm is limited to a positive value for the first predetermined period of time.

In another aspect of the present disclosure, the positive value is defined by an individual torque threshold value predetermined for each of the converter model engine torque, the transmission input torque, and the torque converter slip.

In another aspect of the present disclosure, an update timer sets the first predetermined period of time after the threshold value is reached for at least one of the converter model engine torque, the transmission input torque, or the torque converter slip.

In another aspect of the present disclosure, at least one transmission speed sensor has an output signal defining a gearset speed increase of the automatic transmission thereby defining an indication that the SOWC has mechanically released.

In another aspect of the present disclosure, an SOWC threshold value is included, having the calculated SOWC value compared to the SOWC threshold value and saved in a memory if greater than the SOWC threshold value.

In another aspect of the present disclosure, an update timer sets the second predetermined period of time after the calculated SOWC value is saved in the memory.

In another aspect of the present disclosure, the at least one transmission speed sensor includes at least one transmission internal speed sensor and the at least one transmission output speed sensor.

In another aspect of the present disclosure, the SOWC is connected to a ring gear of a transmission gearset.

In another aspect of the present disclosure, a negative input torque causes a speed increase of the ring gear of the transmission gearset defining the SOWC slip.

In another aspect of the present disclosure, the SOWC includes a reverse strut movable from an engaged position preventing release of an axially rotatable clutch plate to a disengaged position and a selector plate displaced into contact with the reverse strut to move the reverse strut into a non-engaged position thereby releasing the clutch plate for axial rotation. The SOWC released signal indicates when the reverse strut is positioned in the disengaged position.

In another aspect of the present disclosure, the at least one of the converter model engine torque, the transmission input torque, and the torque converter slip torque value defines two of the converter model engine torque, the transmission input torque, and the torque converter slip.

In another aspect of the present disclosure, the at least one of the converter model engine torque, the transmission input torque, and the torque converter slip torque value defines each of the converter model engine torque, the transmission input torque, and the torque converter slip.

In another aspect of the present disclosure, a method for determining when a selectable one-way clutch (SOWC) of a transmission has mechanically released is provided. The transmission has a multiple gearsets, at least one internal speed sensor and at least one output speed sensor. The method includes in a first algorithm measuring each of a converter model engine torque, a transmission input torque, and a torque converter slip; in a second algorithm calculating an SOWC slip; and issuing an SOWC released signal if either all of the measured converter model engine torque, the measured transmission input torque, and the measured torque converter slip are positive, or the calculated SOWC slip is greater than a predetermined threshold.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
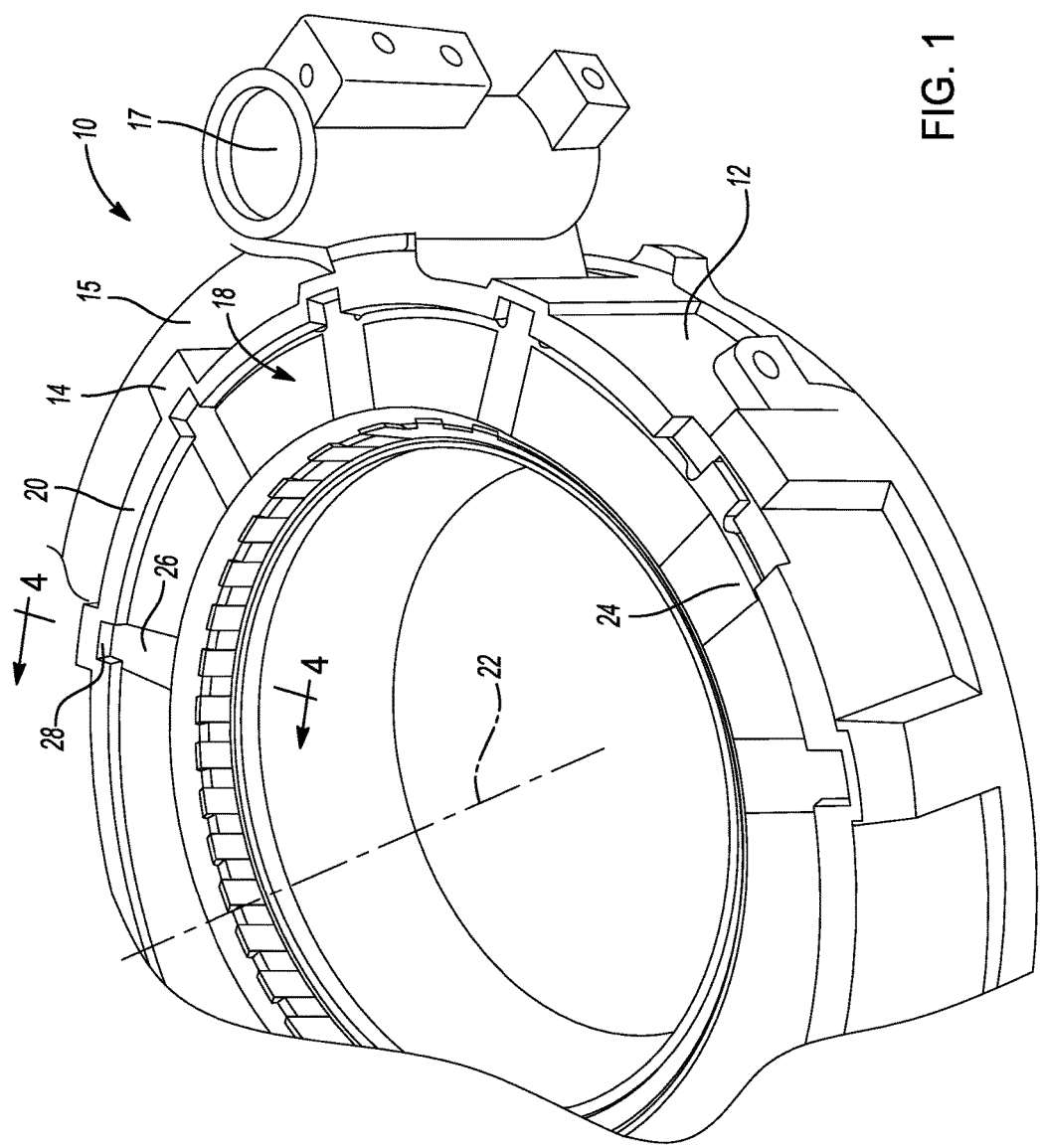
FIG. 1 is a front left perspective view of a selective one-way clutch assembly of the present disclosure.

Referring to FIG. 1, a selectable one-way clutch (SOWC) 10 according to a first aspect includes a clutch body 12 having clutch body splines 14 used to non-rotationally fix the clutch body 12 into a transmission housing 15, only partially shown for clarity. The clutch body 12 includes a body bore 16 within which is received a clutch plate stack 18. The clutch plate stack 18 contacts a body wall 20 defined by the body bore 16 to retain the clutch plate stack 18. The clutch plate stack 18 is centrally disposed with respect to a central longitudinal axis 22 of the clutch body 12, which is coaxially aligned with a central longitudinal axis of the transmission housing 15. The body wall 20 of the clutch plate stack 18 is fixed to the housing 15 preventing axial rotation of the body wall 20. An exemplary first clutch plate 24 of the clutch plate stack 18 is shown. An actuating member 17 connected to the body wall 20 can be operated to change an operating condition of the clutch plates of the clutch plate stack 18. The first clutch plate 24 includes a plurality of perimeter wall splines 26 which mesh with individual body wall splines 28 created on the body wall 20 of the clutch body 12, thereby non-rotationally fixing the first clutch plate 24 to the body wall 20, and also thereby non-rotationally fixing the first clutch plate 24 to the transmission housing 15.

Referring to FIG. 2 and again to FIG. 1, multiple forward struts 30 are rotatably retained to a second clutch plate 32. With the first clutch plate 24 removed from the clutch plate stack 18 for clarity, the multiple forward struts 30 which are rotatably connected to the second clutch plate 32 are positioned in their outwardly biased, fully extended positions. Each of the forward struts 30 are biased toward a fully extended or released position by a biasing member 34 which continuously bias individual ones of the forward struts 30 toward the fully extended position.

Figure 2:
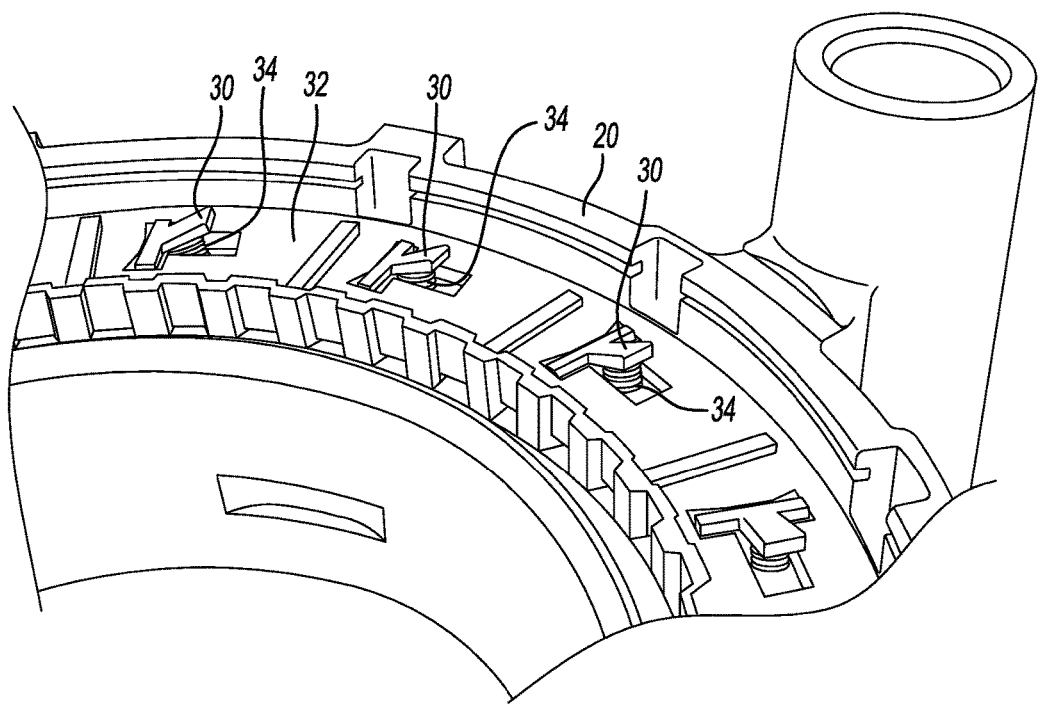
FIG. 2 is a front left perspective view of the one-way clutch assembly of FIG. 1, with a first clutch plate removed.

Referring to FIG. 3 and again to FIGS. 1 through 2, a first plate contact surface 36 of the first clutch plate 24 is normally in sliding contact with the second clutch plate 32, and is shown upside down for clarity. The first clutch plate 24 provides multiple, individual forward strut cavities 38. Individual end surfaces 40 of each of the forward strut cavities 38 define a beginning or transition to an angled surface 42 of a next successive one of the forward strut cavities 38. The perimeter wall splines 26 (one of which is visible in this view) define the maximum outward extent of the first clutch plate 24.

Figure 3:
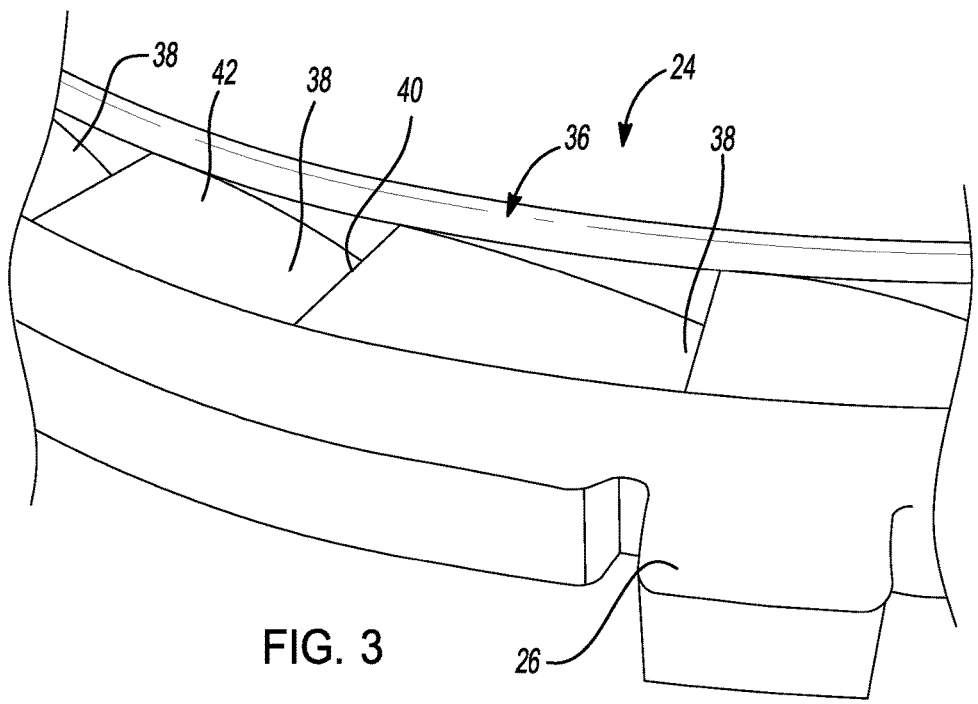
FIG. 3 is a bottom perspective view of the first clutch plate of the one-way clutch assembly of FIG. 1.

Referring to FIG. 4 and again to FIGS. 1 through 3, the clutch plate stack 18 includes a plurality of clutch plates, including the first clutch plate 24 in sliding contact with the second clutch plate 32, and with the second clutch plate 32 in sliding contact with a third clutch plate 44. Each of the first and the third clutch plates 24, 44 is non-rotationally fixed to the body wall 20 and the second clutch plate 32 is rotationally disposed with respect to the first and the third clutch plates 24, 44 and to the body wall 20. As previously noted, the first clutch plate 24 includes multiple first or forward strut cavities 38 extending inwardly from a generally planar first plate contact surface 46. The first plate contact surface 46 is positioned parallel to a second plate first contact surface 48 of the second clutch plate 24. Each forward strut cavity 38 includes the angled surface 42 which transitions into a horizontal surface 50 oriented substantially parallel to the first plate contact surface 46. Each end surface 40 is oriented substantially perpendicular to its corresponding horizontal surface 50.

Figure 4:
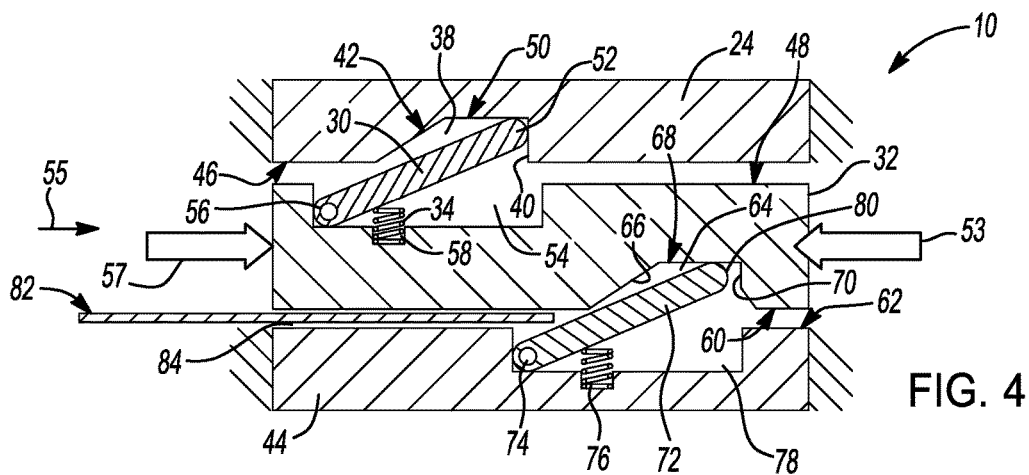
FIG. 4 is a cross sectional end elevational view taken at section 4 of FIG. 1, in a one-way activated or locked position.

In an engaged position of the second clutch plate 32 shown in FIG. 4, a strut end 52 of each forward strut 30 directly contacts the horizontal surface 50 and the end surface 40 of one of the forward strut cavities 38, thereby permitting axial rotation of the second clutch plate 32 in a direction of rotation 53, but preventing axial rotation of the second clutch plate 32 in an opposite second direction of rotation 55 during application of a first axial force 57 applied to the second clutch plate 32. An opposite end of each forward strut 30 is rotatably coupled to the second clutch plate 32 within a strut pocket 54 by a hinge 56. As previously noted, each forward strut 30 is biased toward the strut engaged position shown by the biasing force of one of the biasing members 34, such as a coiled spring, which are each retained within a biasing member cavity 58. Each biasing member 34 therefore acts to bias its associated strut end 52 toward the forward strut cavity 34. The actuating member 17 shown and described in reference to FIG. 1 connected to the hinge 56 can be operated to oppositely rotate the forward strut 30 back toward and into the strut pocket 54 against the biasing force of the biasing member 30 when the strut end 52 is not frictionally captured against the horizontal surface 50 and the end surface 40.

When the forward strut 30 is engaged as shown, the forward strut 30 prevents the second clutch plate 32 from axially rotating in the direction of the first axial force 57, and drive torque can thereby be reacted between the first clutch plate 24 and the second clutch plate 32. At this position, the second clutch plate 32 is also prevented from axial rotation in the first direction of rotation 53 as will be described below. The strut end 52 is preferably a rounded surface to minimize sliding friction between the strut end 52 and the surfaces of the forward strut cavity 38, as well as against the first plate contact surface 46 during axial rotation of the second clutch plate 32. It should however be evident from the engaged configuration of the forward strut 30, that frictional contact of the strut end 52 with both the horizontal surface 50 and the end surface 40 precludes release of the forward strut 30 unless some axial rotation of the second clutch plate 32 in the direction of rotation 53 with respect to the first clutch plate 24 first occurs that will allow the forward strut 30 to rotate about the hinge 56 with clearance between the strut end 52 and the end surface 40.

Upon activation of the activator 17 into an unlocked position, the SOWC 10 operates in the same manner as a traditional one-way clutch. That is, the SOWC 10 allows for relative rotation between the input and output members of an automotive transmission in the first direction of rotation 53, and prevents relative rotation between the input and output members in the opposite second direction of rotation 55. Thus, when in the unlocked position, the SOWC 10 allows for relative rotation in the first direction of rotation 53 between a gear member such as a ring gear member of a planetary gear set (not shown) of the transmission and the transmission housing 15. However, relative rotation between the ring gear member of the planetary gear set and the stationary member or transmission housing 15 is prevented in the second direction of rotation 55.

To provide the necessary axial displacement of the second clutch plate 32 to release the forward strut 30, a release mechanism is provided. The release mechanism includes features provided with each of the second clutch plate 32 and the third clutch plate 44, as follows. The second clutch plate 32 includes a second plate second contact surface 60 which is substantially parallel to the second plate first contact surface 48. The second plate second contact surface 60 is positioned substantially parallel to a third plate first contact surface 62 of the third clutch plate 44. The second clutch plate 32 includes multiple second or reverse strut cavities 64 created in the second plate second contact surface 60 and are therefore oppositely directed with respect to the strut pocket 54. Similar to the forward strut cavity 38, each reverse strut cavity 64 includes an angled surface 66, a horizontal surface 68 oriented parallel to the second plate second contact surface 60, and an end surface 70 oriented perpendicular to the horizontal surface 68. The third clutch plate 44 is rotationally fixed to the clutch body 12 by meshing engagement of a plurality of body wall splines of the third clutch plate 44 with the body wall splines 28 of the clutch body 12 described in reference to FIG. 1.

The third clutch plate 44 includes multiple reverse struts 72 which are individually rotatably connected to the third clutch plate 44 by a hinge 74. The reverse strut 72 is biased using a biasing member 76 such as a coiled spring away from a strut pocket 78 created in the third plate first contact surface 62 of the third clutch plate 44. A reverse strut end 80 of the reverse strut 72 is received in the reverse strut cavity 64 of the second clutch plate 32 and contacts both the horizontal surface 68 and the end surface 70 to prevent rotation of the second clutch plate 32 in the direction of rotation 53.

The release mechanism includes a reverse strut selector plate 82 defining a torque independent release element slidably disposed within a cavity or gap 84 created between the second plate second contact surface 60 of the second clutch plate 32, and the third plate first contact surface 62 of the third clutch plate 44. Horizontal displacement of the reverse strut selector plate 82 angularly deflects the reverse strut 72 out of the reverse strut cavity 64 of the second clutch plate 32 and thereby permits release of the forward strut 30 even if the forward strut 30 is held in direct contact with both the horizontal surface 50 and the end surface 40 of the forward strut cavity 38 by rotational force acting against the second clutch plate 32.

Figure 5:
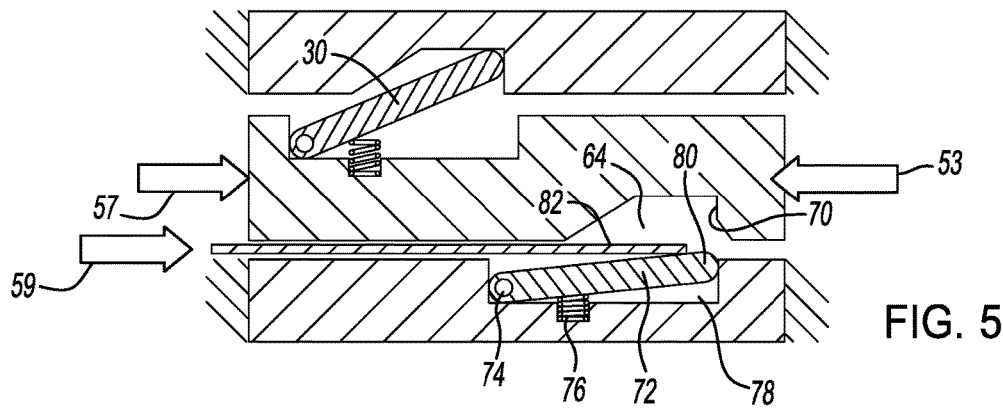
FIG. 5 is a cross sectional end elevational view modified from FIG. 4 showing translation of a reverse strut selector plate toward an engaged position.

Referring to FIG. 5 and again to FIGS. 1 through 4, to release the forward strut 30 from its engaged position shown, a second axial force 59 applied to the reverse strut selector plate 82 horizontally displaces the reverse strut selector plate 82 into direct contact with the reverse strut 72, thereby initiating axial rotation of the reverse strut 72 about the hinge 74. The reverse strut 72 rotates about the hinge 74, compressing the biasing member 76, allowing the reverse strut end 80 of the reverse strut 72 to exit the reverse strut cavity 64 of the second clutch plate 32 and away from contact with both the horizontal surface 68 and the end surface 70. The reverse strut 72 continues to rotate about the hinge 74 until it enters the strut pocket 78.

Referring to FIG. 6 and again to FIGS. 1 through 5, after the reverse strut 72 enters the strut pocket 78, application of a third axial force 61 applied to the second clutch plate 32 in the first direction of rotation 53 induces the second clutch plate 32 to begin axial rotation, displacing the strut end 52 of the forward strut 30 away from the end surface 40. At this time, the forward strut slides down the angled surface 42 providing a clear or free spinning position of the second clutch plate 32 in the axial direction of rotation 53. At this position drive torque cannot be reacted between the first clutch plate 24 and the second clutch plate 32.

Figure 6:
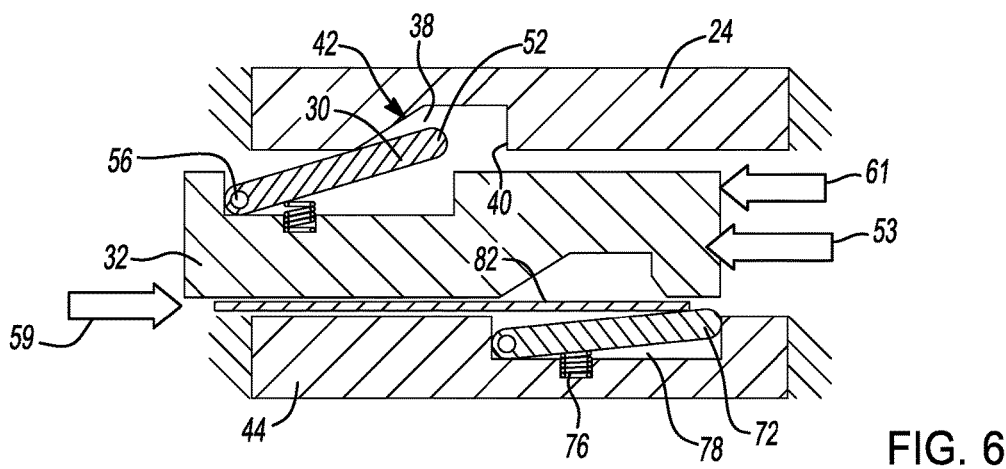
FIG. 6 is a cross sectional end elevational view modified from FIG. 5 to show full engagement of the reverse strut selector plate and initial translation away from the locked position.

With continuing reference to FIG. 6, it is assumed a position sensor is not available to determine a position of the reverse strut selector plate 82 and therefore to confirm when the conditions are correct that the force 61 is high enough for a sufficient period of time to ensure that a gap is present between the strut end 52 and the end surface 40 and therefore that the SOWC 10 has been released. According to several aspects, one or more algorithms can be used in place of the position sensor to identify the conditions when the SOWC 10 has been mechanically released. As shown in FIG. 6, a positive torque applied as shown to the first clutch plate 24 and the third clutch plate 44, and an oppositely directed positive torque applied to the second clutch plate 32 tends to unload the reverse strut 72 and allow release of the forward strut 30. Measurement of positive torque can therefore be used as one indicator that the SOWC 10 has mechanically released, which will be described in greater detail in reference to FIG. 7.

Figure 7:
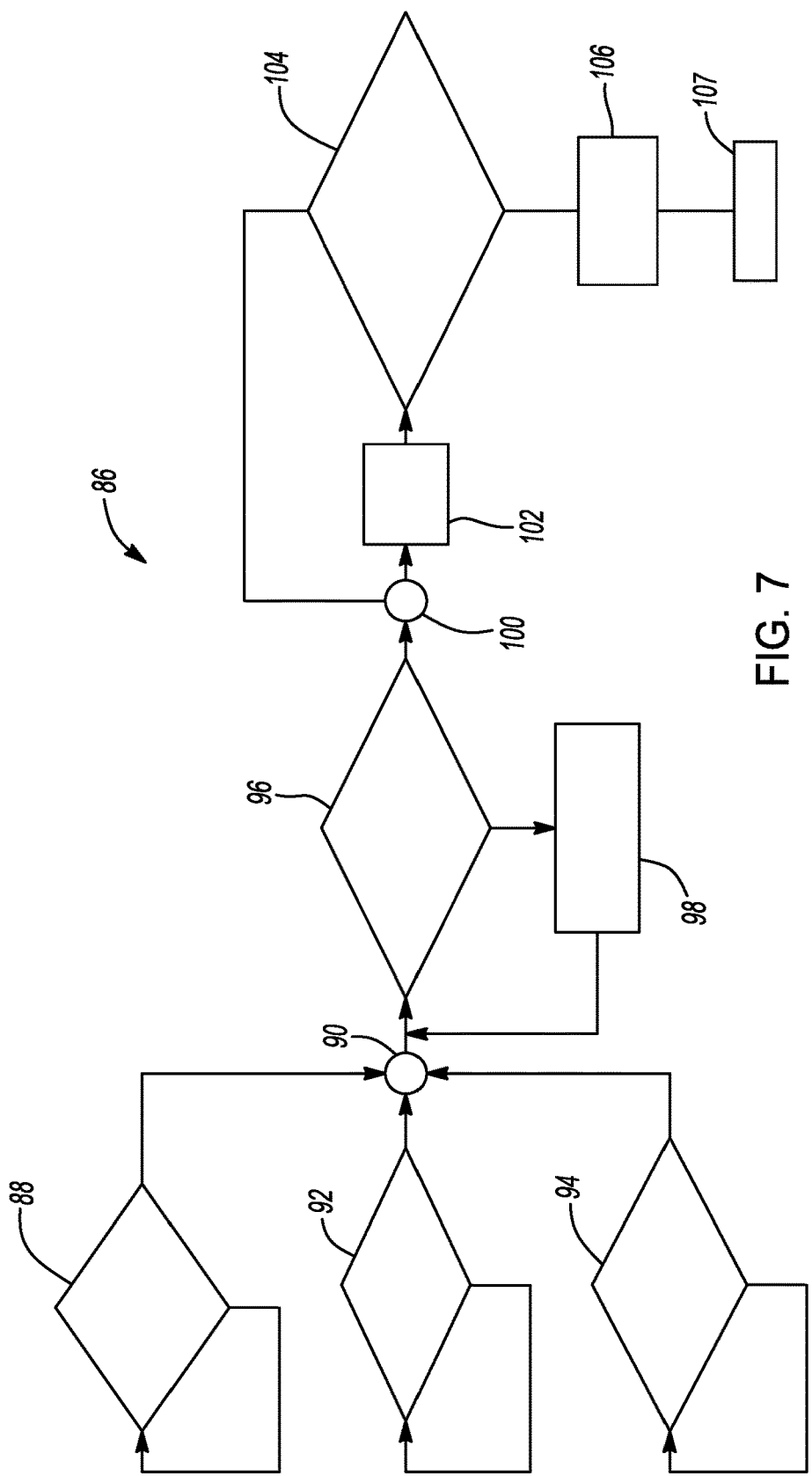
FIG. 7 is a diagrammatic flow chart under conditions of positive torque on the SOWC.

Referring to FIG. 7 a positive torque flow chart defining a first or positive torque algorithm 86 provides three measurement models of positive torque. According to several aspects, when at least one, any two, or all three of the predetermined thresholds of torque of the measurement models is present, a positive indicator is present and a signal is generated that a mechanical release of the SOWC 10 has occurred. In a first step, a converter model engine torque 88 is measured. The converter model engine torque 88 is determined from a torque converter condition plus an engine output. According to several aspects, when a threshold condition of approximately 30 Nm to approximately 65 Nm converter model engine torque is present, the converter model engine torque 88 of the first step is deemed to be positive. If the converter model engine torque 88 is not positive, the program returns to the first step. If the threshold condition is met and therefore when the converter model engine torque 88 is positive a converter model engine torque positive indication signal is generated and saved to a memory 90.

In a parallel running second step, a transmission input torque 92 is measured. According to several aspects, when a transmission input torque threshold condition of approximately 25 Nm to approximately 35 Nm input torque is present, with the threshold dependent on transmission temperature, the transmission input torque 92 of the second step is deemed to be positive. If the transmission input torque 92 is not positive, the program returns to the second step. If the threshold condition is met and therefore when the transmission input torque 92 is positive, an input torque positive indication signal is generated and saved to the memory 90.

In a parallel running third step, a value of a torque converter slip 94 is measured. The torque converter slip 94 (in rpm) is measured as an engine speed (rpm) minus a transmission turbine speed (rpm). According to several aspects a threshold of 75 rpm is used to establish when the value of torque converter slip 94 becomes positive, which is independent of transmission temperature. If the torque converter slip 94 is not positive, the program returns to the third step. If the threshold condition is met and therefore when the torque converter slip 94 is positive a torque converter slip positive indication signal is generated and saved to the memory 90.

In a following fourth step the input from the first, second and third steps which is saved in the memory 90 is evaluated to determine if each continues to be positive. If any of the input from the first, second or third steps saved in the memory 90 is not positive, in a fifth step the program reevaluates any one or all of the torque models separately and returns to the fourth step. If all of the input from the first, second and third steps saved in the memory 90 is held or remains positive as identified in the sixth step, an all positive signal is generated and saved in a memory 100. In a seventh step, an update timer 102 is used to set a predetermined period of time to check the status of the information saved in the memory 100. According to several aspects, the predetermined period of time can range from approximately 50 ms up to approximately 2 sec dependent on transmission temperature. The predetermined period of time is used as a hold point to ensure a sufficient period of time is allowed for the reverse struts 72 described in reference to FIGS. 4 through 6 to rotate into the strut pockets 78, and therefore to establish when the reverse struts 72 cannot hold torque.

In a following or eighth step the status of the all positive signal saved in the memory 100 is checked by a comparison routine 104 to identify if any one, any two, or all the torque signals have remained positive for the predetermined period of time set by the update timer in step 102. If the result of the status check performed in the comparison routine 104 is negative, the program returns to the memory 100 to identify if the data saved in the memory 100 has changed. In a final step if the result of the status check performed in the comparison routine 104 is positive, an SOWC released signal 106 is generated and forwarded to a transmission controller 107 which, when a positive torque is present (i.e., the driver is engaging the accelerator) releases a program flag that permits other algorithms of the transmission controller 107 to shift the transmission from a gear in which the SOWC 10 is engaged to a gear in which the SOWC 10 is released or disengaged.

It is noted that according to several aspects the first or positive torque algorithm of the present disclosure requires all three of the torque values 88, 92, 94 identified in the first, second and third steps to be assessed prior to generation of the SOWC released signal 106. According to further aspects, any two of the torque values 88, 92, 94 identified in the first, second, and third steps can be assessed prior to generation of the SOWC released signal 106. According to further aspects, any one of the torque values 88, 92, 94 identified in the first, second, and third steps can be assessed prior to generation of the SOWC released signal 106. It is noted that although any one of the torque values 88, 92, 94 is adequate to satisfy the first or positive torque algorithm production of the SOWC released signal 106, additional reliability is gained by assessing two or all three of the torque values 88, 92, 94 prior to producing the SOWC released signal 106.

With reference in general to FIGS. 8 through 9 and again to FIG. 6, when a position sensor is not available to determine a position of the reverse strut selector plate 82 and therefore to confirm if the SOWC 10 has been mechanically released, according to several aspects, a second or negative torque algorithm 142 can be used in place of the position sensor to identify when under negative torque conditions the SOWC 10 has been mechanically released. When negative input torque conditions are present, a speed increase of one of the components of a gearset of an automatic transmission can be used as an indicator that the SOWC 10 has mechanically released. For example, with further reference to FIG. 8, measurement of negative input torque from a speed increase of the gearset, defined as SOWC slip, can be calculated by comparing the signal from a transmission output speed sensor to the signal from a transmission internal speed sensor. The SOWC slip value identified by the compared signals from the speed sensors are used as another indicator that the SOWC 10 has mechanically released.

Figure 8:
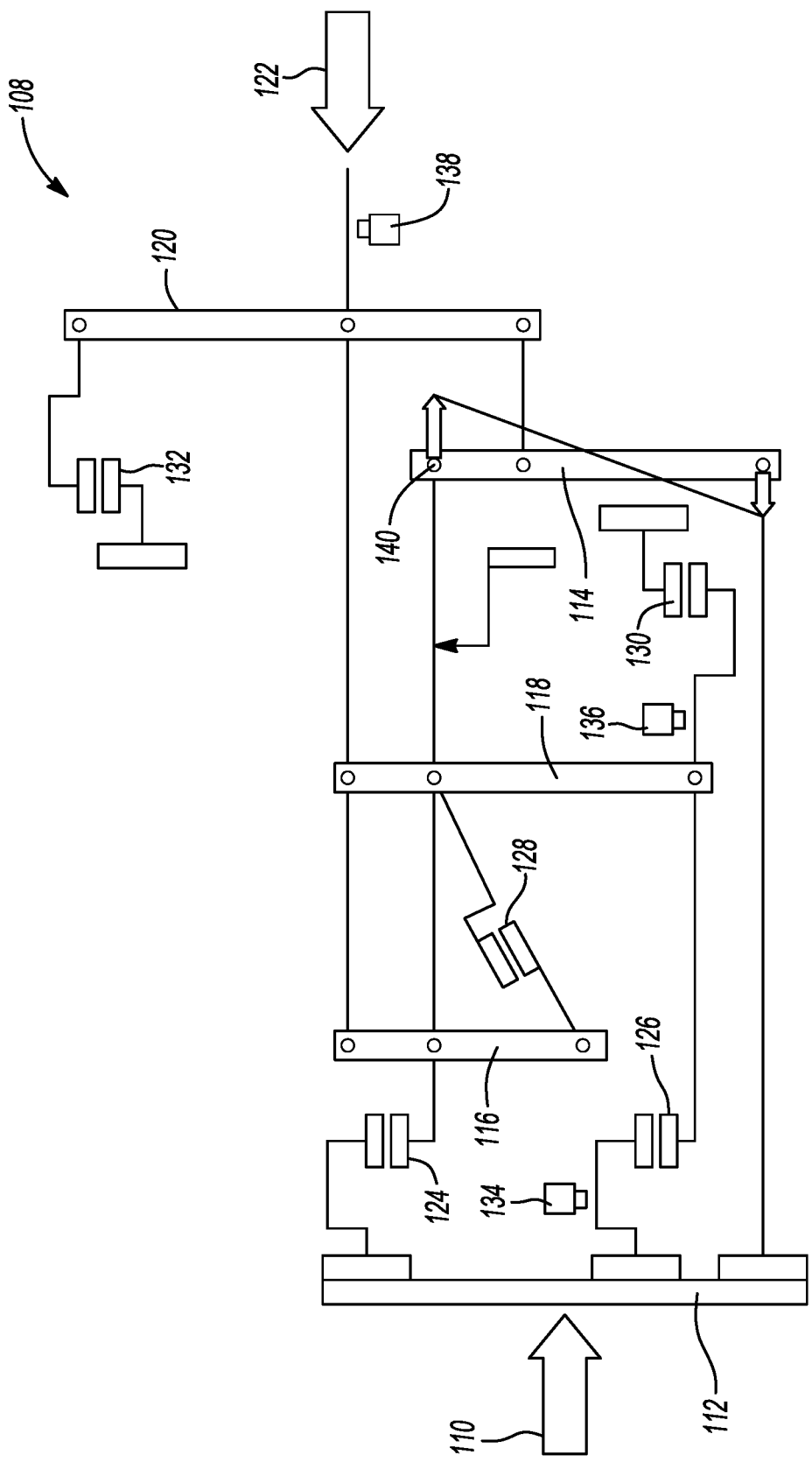
FIG. 8 is a lever diagram of an automatic transmission incorporating the selective one-way clutch assembly release identification system of the present disclosure.
Figure 9:
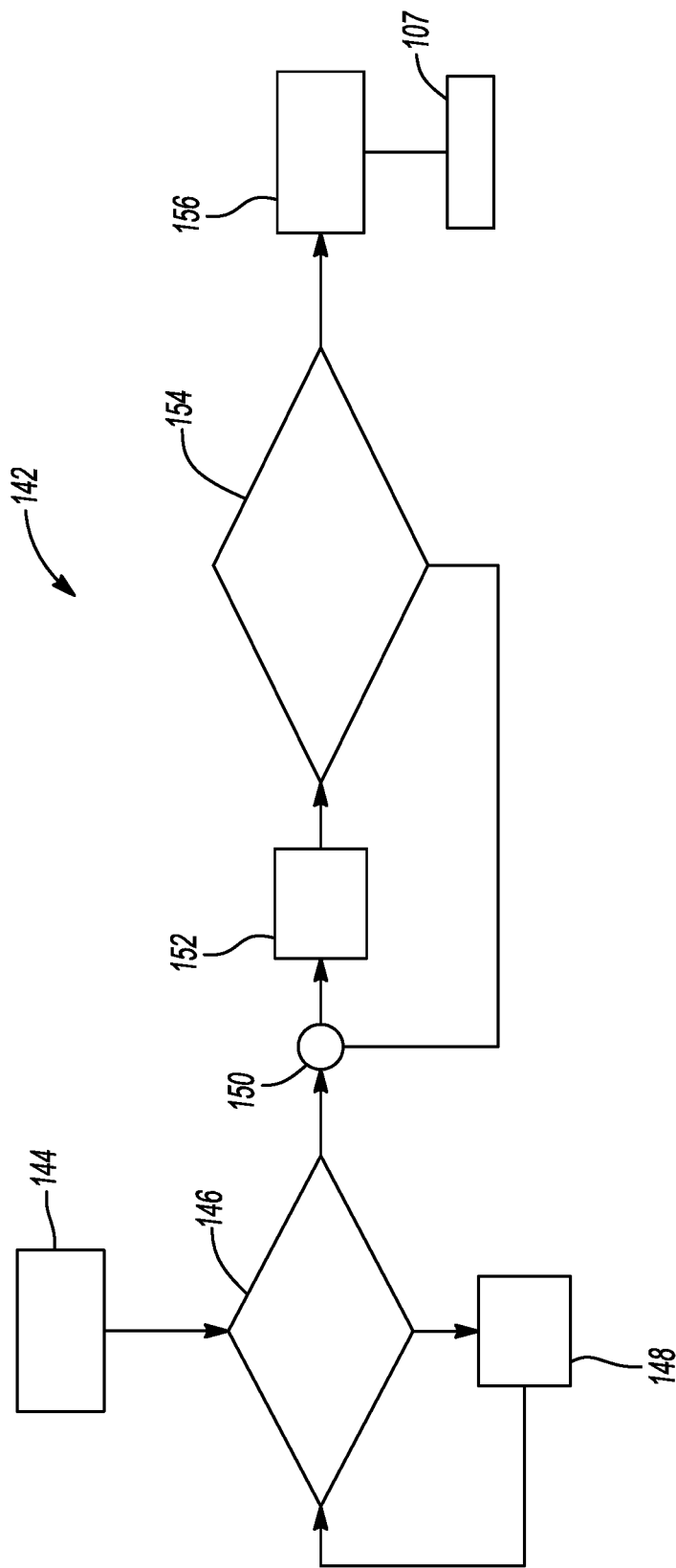
FIG. 9 is a diagrammatic flow chart under conditions of negative torque creating selective one-way clutch assembly slip.

Referring more specifically to FIG. 8, an exemplary automatic transmission 108 having four gearsets is illustrated in a three node lever diagram format. A lever diagram is a schematic representation of the components of a mechanical device such as meshing gear sets or planetary gear sets. Each individual lever represents a planetary gear set or meshed gear pair. The three basic mechanical components of the planetary gear are each represented by a node while the gear pairs are represented by a node and the rotation change represented by a node fixed to ground. Therefore, a single lever contains three nodes. In a planetary gear set, one node represents the sun gear, one the planet gear carrier, and one the ring gear. In a meshed gear pair, one node represents a first gear, one a second gear, and the third the rotational direction change between the meshed gears.

In some cases, two levers may be combined into a single lever having more than three nodes, and typically four nodes. For example, if two nodes on two different levers are connected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or connections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

A transmission input 110 receiving the torque output from a prime mover is transferred to a member such as a torque converter 112, and the torque input is distributed to one or more gearsets, such as planetary gearsets. The one or more gearsets can include an input gearset 114, an overdrive gearset 116, a reaction gearset 118, and an output gearset 120, each represented as a three node format, which together connect to a transmission output 122. The automatic transmission 108 can also include multiple hydraulically controlled clutches and/or brakes, including a first clutch 124, a second clutch 126, a third clutch 128, a fifth clutch 130, and a sixth clutch 132 which are coupled to individual components of the various gearsets. According to several aspects, the transmission internal speed sensors include a first internal speed sensor 134 and a second internal speed sensor 136. According to several aspects, a transmission output speed sensor 138 is provided to signal a transmission output speed at the output 122. According to several aspects, negative input torque conditions cause a node 140 of the input gearset 114 to increase in speed if the SOWC 10 has released.

Referring to FIG. 9 and again to FIG. 8, a negative torque flowchart 108 provides steps applied using the increase in speed such as the increase in speed at the node 140 as an indicator the SOWC 10 has released. In a first step 144, SOWC slip is calculated for example using the signals output from the second internal speed sensor 136 and the transmission output speed sensor 138. In a second step 146 a determination is made if the SOWC slip value is greater than a threshold value. According to several aspects, the SOWC slip threshold value is approximately 30 rpm. In a step 148, if the SOWC slip is not greater than the threshold value as determined in step 146, the program returns to step 146. If the SOWC slip is greater than the threshold value as determined in step 146, the resultant SOWC slip value is saved in a memory 150.

In a step 152, after the SOWC slip threshold value is reached, a predetermined time delay is initiated by an update timer. According to several aspects, the predetermined time delay ranges from approximately 50 ms up to approximately 300 ms dependent on transmission temperature. Similar to the positive torque algorithm, the predetermined period of time of 50 ms up to approximately 300 ms for the negative torque algorithm is used as a hold point to ensure a sufficient period of time is allowed for the reverse struts 72 described in reference to FIGS. 4 through 6 to rotate into the strut pockets 78, and therefore to establish when the reverse struts 72 cannot hold torque under negative torque conditions. In a query step 154 defining a program hold, it is determined if the SOWC slip value has been held above the threshold value for the predetermined time delay value. If the answer to the query conducted in step 154 is NO (the SOWC slip value has NOT been held above the threshold value for the predetermined time delay value), the program returns to the memory 150 to query the value most recently saved in the memory 150.

If the answer to the query conducted in step 154 is YES (the SOWC slip value HAS been held above the threshold value for the predetermined time delay value), in a final step 156 an SOWC released signal is issued and forwarded to the transmission controller 107. When a negative torque is present (i.e., when the driver releases the accelerator with the vehicle in motion) the SOWC released signal clears a program "flag" and allows the transmission to shift from a gear in which the SOWC 10 is engaged to a gear in which the SOWC is released.

It is noted that the quantity of gearsets identified in the present disclosure is not limiting, and the quantity of gearsets can vary, including having less than four or more than four gearsets within the scope of the present disclosure. The quantity and positioning of the clutches and brakes can also vary from those disclosed herein within the scope of the present disclosure. The positioning of the speed sensors can also vary from those disclosed herein within the scope of the present disclosure.

According to several aspects of the present disclosure, a system for determining when a selectable one-way clutch 10 of an automatic transmission has mechanically released includes an update timer 102 for identifying if each of a converter model engine torque 88, a transmission input torque 92, and a torque converter slip 94 are positive for a predetermined period of time. An SOWC slip value 144 is calculated using an output signal from each of: at least one transmission internal speed sensor 136 producing an output signal representative of a speed of an internal component 118 of a transmission; and at least one transmission output speed sensor 138 producing an output signal representative of a speed of an output 122 of the transmission. An SOWC released signal 106, 156 is issued if either all of the measured converter model engine torque 88, the measured transmission input torque 92, and the measured torque converter slip 94 are positive for at least the predetermined period of time, or the calculated SOWC slip value 144 is greater than a predetermined threshold.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for signaling when a selectable one-way clutch (SOWC) of an automatic transmission has mechanically released, comprising:
   a positive torque algorithm continuously collecting a torque value for at least one of a converter model engine torque, a transmission input torque, and a torque converter slip;
   a negative torque algorithm continuously running in parallel with the positive torque algorithm calculating an SOWC slip value; and
   a SOWC released signal issued if either the value collected by the positive torque algorithm is maintained for a first predetermined period of time or if the SOWC slip value calculated by the negative torque algorithm is maintained for a second predetermined period of time.

2. The system of claim 1, wherein the value collected by the positive torque algorithm is limited to a positive value for the first predetermined period of time.

3. The system of claim 2, wherein the positive value is defined by an individual torque threshold value predetermined for each of the converter model engine torque, the transmission input torque, and the torque converter slip.

4. The system of claim 3, further including an update timer setting the first predetermined period of time after the threshold value is reached for at least one of the converter model engine torque, the transmission input torque, or the torque converter slip.

5. The system of claim 1, further including at least one transmission speed sensor having an output signal defining a gearset speed increase of the automatic transmission thereby defining an indication that the SOWC has mechanically released.

6. The system of claim 5, further including a SOWC threshold value, the calculated SOWC value compared to the SOWC threshold value and saved in a memory if greater than the SOWC threshold value.

7. The system of claim 6, further including an update timer setting the second predetermined period of time after the calculated SOWC value is saved in the memory.

8. The system of claim 5, wherein the at least one transmission speed sensor includes at least one transmission internal speed sensor and the at least one transmission output speed sensor.

9. The system of claim 1, wherein the SOWC is connected to a ring gear of a transmission gearset.

10. The system of claim 9, wherein a negative input torque causes a speed increase of the ring gear of the transmission gearset defining the SOWC slip.

11. The system of claim 1, wherein the SOWC includes:
a reverse strut movable from an engaged position preventing release of an axially rotatable clutch plate to a disengaged position; and
a selector plate displaced into contact with the reverse strut to move the reverse strut into the disengaged position thereby releasing the clutch plate for axial rotation;
the SOWC released signal indicating when the reverse strut is positioned in the disengaged position.

12. The system of claim 1, wherein the at least one of the converter model engine torque, the transmission input torque, and the torque converter slip torque value defines two of the converter model engine torque, the transmission input torque, and the torque converter slip.

13. The system of claim 12, wherein the at least one of the converter model engine torque, the transmission input torque, and the torque converter slip torque value defines each of the converter model engine torque, the transmission input torque, and the torque converter slip.

14. A method for determining when a selectable one-way clutch (SOWC) of a transmission has mechanically released, the transmission having a multiple gearsets, at least one internal speed sensor and at least one output speed sensor, the method comprising:
in a first algorithm measuring each of a converter model engine torque, a transmission input torque, and a torque converter slip;
in a second algorithm calculating an SOWC slip; and
issuing a SOWC released signal if either all of the measured converter model engine torque, the measured transmission input torque, and the measured torque converter slip are positive, or the calculated SOWC slip is greater than a predetermined threshold.

15. The method of claim 14, further including saving a value of each of the measured converter model engine torque, the transmission input torque, and the torque converter slip prior to the issuing step.

16. The method of claim 15, further including confirming the value of each of the measured converter model engine torque, the transmission input torque, and the torque converter slip are positive for a predetermined period of time prior to the issuing step.

17. The method of claim 14, wherein the calculating a SOWC slip step further includes measuring an output signal of at least one transmission internal speed sensor.

18. The method of claim 17, wherein the calculating a SOWC slip step further includes measuring an output signal of at least one transmission output speed sensor.

19. The method of claim 14, further including:
setting a predetermined period of time; and
identifying that the SOWC slip is held above the predetermined threshold for at least the predetermined period of time prior to issuing the SOWC released signal.

20. A system for determining when a selectable one-way clutch (SOWC) of an automatic transmission has mechanically released, comprising:
an update timer for identifying if each of a converter model engine torque, a transmission input torque, and a torque converter slip are positive for a predetermined period of time;
a SOWC slip value calculated using an output signal from each of:
at least one transmission internal speed sensor producing an output signal representative of a speed of an internal component of a transmission; and
at least one transmission output speed sensor producing an output signal representative of a speed of an output of the transmission; and
a SOWC released signal issued if either all of the measured converter model engine torque, the measured transmission input torque, and the measured torque converter slip are positive for at least the predetermined period of time, or the calculated SOWC slip value is greater than a predetermined threshold.

* * * * *